(12) United States Patent
Fujii et al.

(10) Patent No.: US 12,423,348 B2
(45) Date of Patent: Sep. 23, 2025

(54) CLASSIFICATION APPARATUS, CLASSIFICATION METHOD AND COMPUTER READABLE MEDIUM

(71) Applicant: NEC Corporation, Tokyo (JP)

(72) Inventors: Asako Fujii, Tokyo (JP); Iain Melvin, Princeton, NJ (US); Yuki Chiba, Tokyo (JP); Masayuki Sakata, Tokyo (JP); Erik Kruus, Hillsborough, NJ (US); Chris White, Branchburg, NJ (US)

(73) Assignee: NEC CORPORATION, Tokyo (JP)

( * ) Notice: Subject to any disclaimer, the term of this patent is extended or adjusted under 35 U.S.C. 154(b) by 399 days.

(21) Appl. No.: 18/176,841

(22) Filed: Mar. 1, 2023

(65) Prior Publication Data

US 2023/0315783 A1 Oct. 5, 2023

Related U.S. Application Data

(60) Provisional application No. 63/315,755, filed on Mar. 2, 2022.

(51) Int. Cl.
*G06F 16/583* (2019.01)
*G06F 16/55* (2019.01)
*G06F 16/58* (2019.01)

(52) U.S. Cl.
CPC ............ *G06F 16/583* (2019.01); *G06F 16/55* (2019.01); *G06F 16/5866* (2019.01)

(58) Field of Classification Search
None
See application file for complete search history.

(56) References Cited

U.S. PATENT DOCUMENTS

| | | | |
|---|---|---|---|
| 2008/0291272 A1* | 11/2008 | Krahnstoever | G06T 7/246 348/E5.025 |
| 2013/0342450 A1* | 12/2013 | Tetsuhashi | G06F 3/011 345/156 |
| 2016/0217324 A1* | 7/2016 | Burton | G06V 20/54 |
| 2018/0018079 A1* | 1/2018 | Monastyrshyn | G06T 3/40 |
| 2018/0330619 A1* | 11/2018 | Shimizu | G08G 1/166 |

FOREIGN PATENT DOCUMENTS

WO 2015/049732 A1 4/2015

* cited by examiner

*Primary Examiner* — Bernard Krasnic
(74) *Attorney, Agent, or Firm* — Sughrue Mion, PLLC (57) ABSTRACT

A classification apparatus according to the present disclosure includes an input unit configured to receive an operation performed by a user, an extraction unit configured to extract moving image data by using a predetermined rule, a display control unit configured to display an icon corresponding to the extracted moving image data on a screen of a display unit, a movement detection unit configured to detect a movement of the icon on the screen caused by the operation performed by the user, and a specifying unit configured to specify a classification of the moving image data corresponding to the icon based on a position of the icon on the screen.

10 Claims, 8 Drawing Sheets

CLASSIFICATION APPARATUS, CLASSIFICATION METHOD AND COMPUTER READABLE MEDIUM

TECHNICAL FIELD

The present disclosure relates to a classification apparatus, a classification method, and a computer readable medium.

BACKGROUND ART

There are cases where a user wants to find, from a large amount of moving image data, moving image data containing a scene he/she wants to see. However, it is very difficult for the user to manually check the contents of the whole moving image data.

Therefore, recently, a technology for extracting and classifying moving image data by using predetermined rules (conditions) or a fixed learning model has been proposed. According to this technology, a user can search for moving image data containing a scene he/she wants to see based on the result of the classification of moving image data. For example, Patent Literature 1 discloses a technology for extracting an image that meets conditions specified by a user.

CITATION LIST

Patent Literature

Patent Literature 1: International Patent Publication No. WO2015/049732

SUMMARY OF INVENTION

Technical Problem

However, the result itself of classification of moving image data, which is obtained by using predetermined rules or a fixed learning model, cannot be changed. Therefore, when the accuracy of the result of classification of moving image data is poor, it becomes difficult for the user to find the scene he/she wants to see.

Therefore, in view of the above-described problem, an object of the present disclosure is to provide a classification apparatus, a classification method, and a computer readable medium capable of classifying moving image data more accurately.

Solution to Problem

A classification apparatus according to an aspect includes:
an input unit configured to receive an operation performed by a user;
an extraction unit configured to extract moving image data by using a predetermined rule;
a display control unit configured to display an icon corresponding to the extracted moving image data on a screen of a display unit;
a movement detection unit configured to detect a movement of the icon on the screen caused by the operation performed by the user; and
a specifying unit configured to specify a classification of the moving image data corresponding to the icon based on a position of the icon on the screen.

A classification method according to an aspect is a classification method performed by a classification apparatus, including:
a step of extracting moving image data by using a predetermined rule;
a step of displaying an icon corresponding to the extracted moving image data on a screen of a display unit;
a step of detecting a movement of the icon on the screen caused by an operation performed by a user; and
a step of specifying a classification of the moving image data corresponding to the icon based on a position of the icon on the screen.

A computer readable medium according to an aspect is a non-transitory computer readable medium storing a program to be executed by a computer, the program including:
a step of extracting moving image data by using a predetermined rule;
a step of displaying an icon corresponding to the extracted moving image data on a screen of a display unit;
a step of detecting a movement of the icon on the screen caused by an operation performed by a user; and
a step of specifying a classification of the moving image data corresponding to the icon based on a position of the icon on the screen.

Advantageous Effects of Invention

According to the above-described aspect, the present disclosure can provide an advantageous effect that a classification apparatus, a classification method, and a computer readable medium capable of classifying moving image data more accurately can be provided.

EXAMPLE EMBODIMENT

An example embodiment according to the present disclosure will be described hereinafter with reference to the drawings. Note that the following description and the drawings are partially omitted and simplified as appropriate for clarifying the explanation. Further, the same reference numerals (or symbols) are assigned to the same components/ structures throughout the drawings, and redundant descriptions thereof are omitted as appropriate. Further, specific numerical values and the like shown below are shown just for an illustrative purpose in order to facilitate the understanding of the present disclosure, and they are not limited to the below-shown numerical values and the like.

Further, in the following description, it is assumed that moving image data are those obtained by photographing (i.e., filming) outside views and the like of a vehicle by an on-board camera(s) installed in the vehicle. Further, it is assumed that a user uses a classification apparatus according to the present disclosure to find, from moving image data accumulated in a server (not shown), moving image data containing a scene he/she wants to see (e.g., an adventurous scene). However, the purpose and the like of the classification apparatus according to the present disclosure is not limited to the above-described purpose and the like, and the classification apparatus can be used for classification of other arbitrary moving image data.

First Example Embodiment

Figure 1:
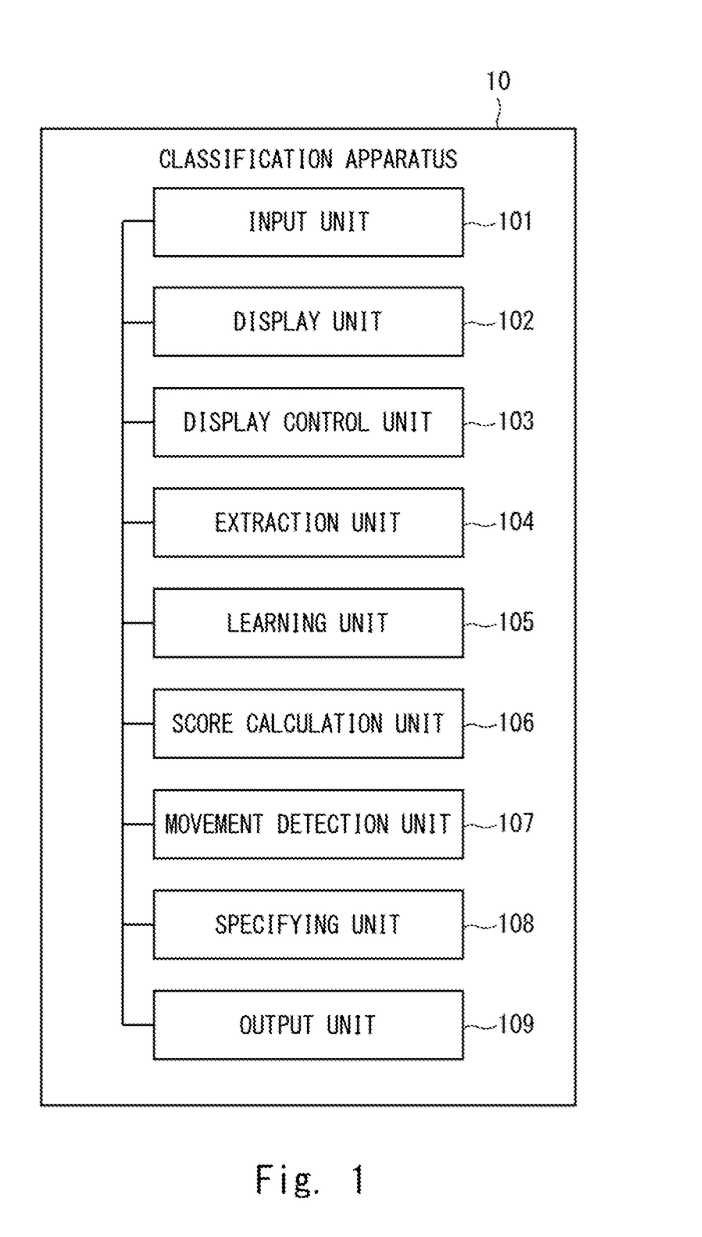
FIG. 1 is a block diagram showing an example of a configuration of a classification apparatus according to a first example embodiment.

Firstly, an example of a configuration of a classification apparatus 10 according to a first example embodiment will be described with reference to FIG. 1. As shown in FIG. 1, the classification apparatus 10 according to the first example embodiment includes an input unit 101, a display unit 102, a display control unit 103, an extraction unit 104, a learning unit 105, a score calculation unit 106, a movement detection unit 107, a specifying unit 108, and an output unit 109.

The input unit 101 receives an operation from a user. The input unit 101 is implemented, for example, by a mouse, a touch panel, a keyboard, or the like. Note that it is assumed that all operations performed by the user described hereinafter are performed through the input unit 101.

The display unit 102 includes a screen on which various types of information are displayed. For example, the display unit 102 is implemented by a liquid-crystal display or the like.

Note that the input unit 101 and the display unit 102 may be integrally formed as a touch-panel-type display.

The display control unit 103 displays various types of information on the screen of the display unit 102 by controlling the display unit 102.

Figure 2:
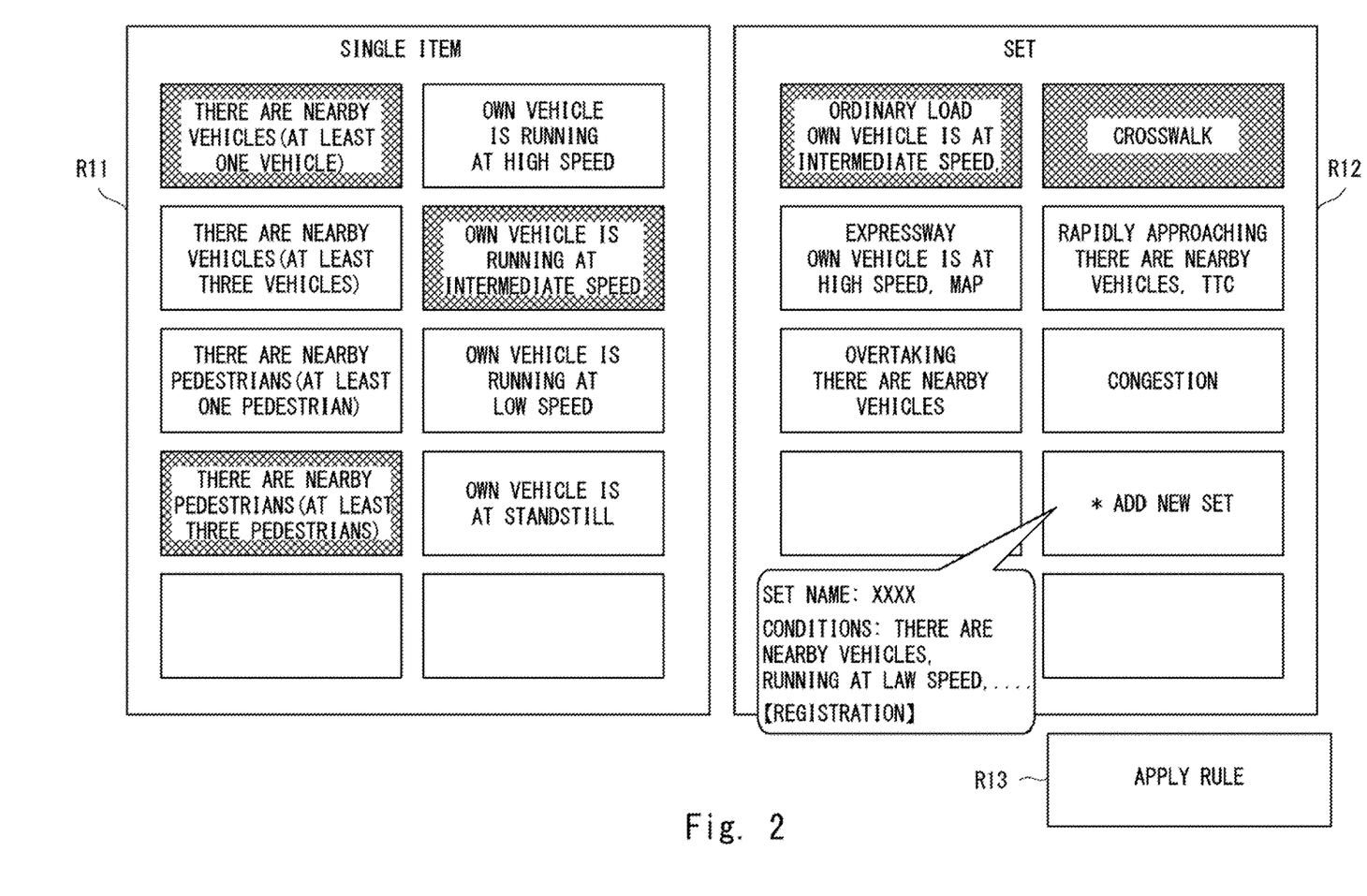
FIG. 2 shows an example of a screen of a display unit according to the first example embodiment.

For example, the display control unit 103 displays a screen (e.g., a window) on the display unit 102 for making (or letting) the user specify a predetermined rule(s) for extracting moving image data from moving image data accumulated in a server (not shown). FIG. 2 shows an example of the screen (e.g., the window) of the display unit 102 in this process.

The predetermined rule contains a combination of a plurality of conditions. Each of the conditions indicates a state of a nearby object (e.g., other vehicles, pedestrians, road signs, or the like) shown in moving image data or a state of the own vehicle (e.g., a state indicating whether the own vehicle is at a standstill or is running, and in the case of the vehicle being running, a running speed or the like of the vehicle).

In the screen shown in FIG. 2, the display control unit 103 displays each condition as a "Single Item" button in a display area R11, and displays combinations of a plurality of conditions as "Set" buttons in a display area R12. In this way, the user can easily recognize conditions that can be included in the predetermined rule. Further, the display control unit 103 displays, in a "Set" button, a set name of the set and conditions be included in the set. In this way, the user can easily recognize details of the set. Further, a new "set" can be added by the user. When the user performs an operation for entering a set name of a set and conditions be included in the set, the display control unit 103 displays a new "Set" button.

When the user selects conditions be included in a predetermined rule on the screen shown in FIG. 2, the user performs a clicking operation on at least one of the "Single Item" buttons and the "Set" buttons that indicate the conditions. As a result, the display control unit 103 displays the "Single Item" button or the "Set" button clicked by the user in a shaded manner (or a hatched manner). Further, when the user clicks the "Set" button, the display control unit 103 also displays the "Single Item" button(s) indicating the condition(s) be included in the set in a shaded manner. In this way, the user can easily recognize the conditions be included in the set. Note that the displaying method performed by the display control unit 103 is not limited to displaying a button clicked by a user in a shaded manner. That is, the display control unit 103 may display the button in other manners such as displaying the button in an inverted manner or displaying it in a specific color. Note that there are cases where choices made by a user are inconsistent with each other. For example, there may be a case where a user selects both a "single item" and a "Set", but condition for the running speed indicated by the "single item" is different from that for the running speed included in the "Set". Accordingly, the display control unit 103 may determine a priority order of buttons in advance. Then, when there is inconsistency between choices made by a user, the display control unit 103 adopts the condition of a button having a higher priority. Alternatively, when there is inconsistency between choices made by a user, the display control unit 103 may produce a warning and thereby urge the user to select a button(s) again.

Further, in the screen shown in FIG. 2, the display control unit 103 displays a "Rule Application" button in a display area R13.

In the screen shown in FIG. 2, the user clicks on the "Rule Application" button when he/she determines (i.e., sets) the conditions be included in the predetermined rule.

When the predetermined rule is specified by the operation performed by the user, the extraction unit 104 extracts, from moving image data accumulated in a server (not shown), moving image data by using the specified predetermined rule. Specifically, the extraction unit 104 extracts moving image data that contains a scene that may conform to the predetermined rule and is within a range of a predetermined number of seconds (e.g., five seconds) before and after the scene.

Note that a plurality of feature values are generated from moving image data. The feature values are, for example, the running speed of the own vehicle, and an object distance, i.e., a distance between a nearest one of nearby objects outside the vehicle and the own vehicle.

The learning unit 105 learns a weight of each of a plurality of feature values generated from the moving image data through machine learning.

The score calculation unit 106 generates each of a plurality of feature values for the moving image data extracted by the extraction unit 104, and calculates a score by using the plurality of generated feature values and the weight of each of the plurality of feature values learned by the learning unit 105. Specifically, the score calculation unit 106 calculates the score by multiplying each of the plurality of feature values by a respective weight.

Note that the learning unit 105 and the score calculation unit 106 may be formed (or configured) by dedicated AI (Artificial Intelligence).

Figure 3:
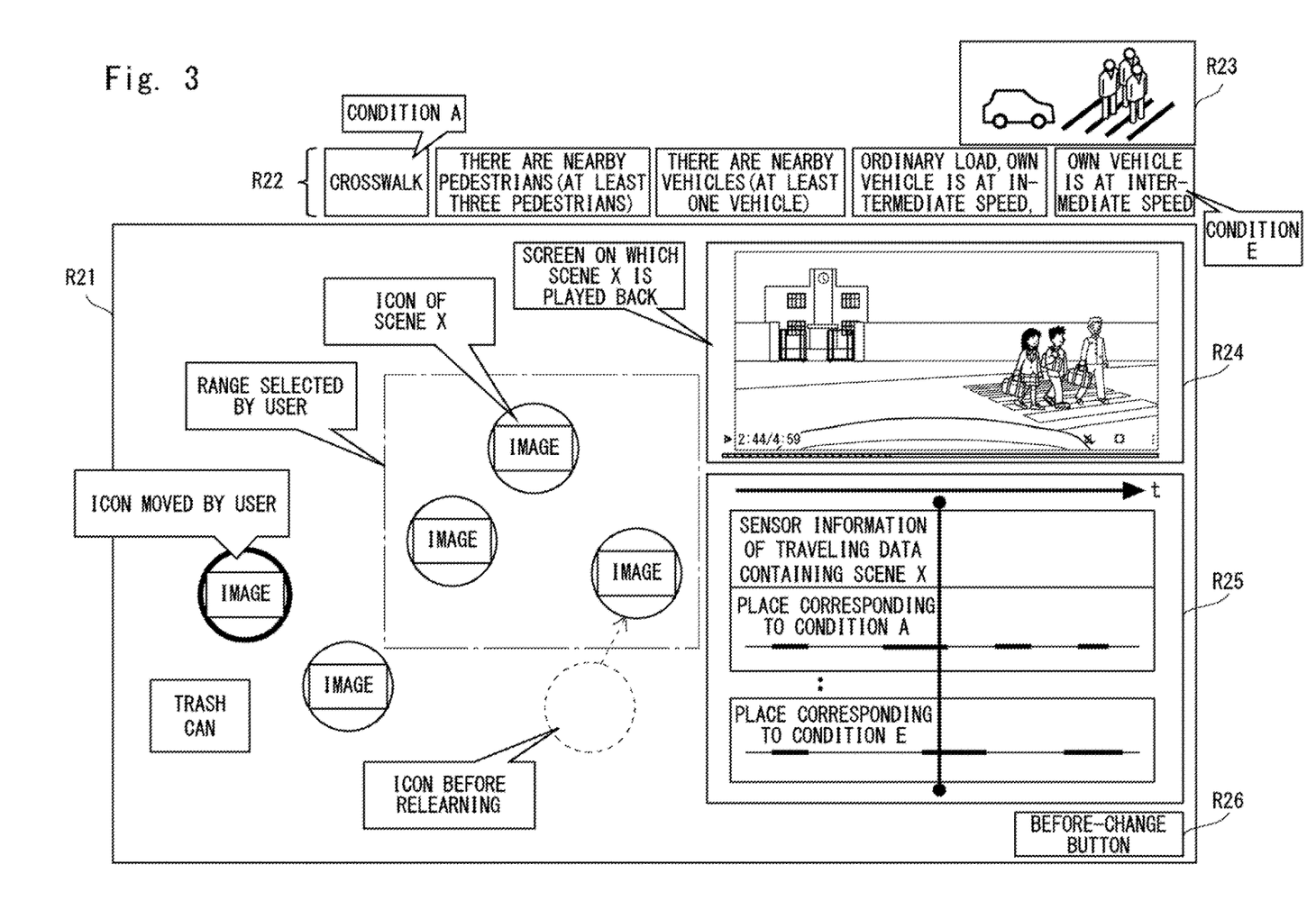
FIG. 3 shows another example of the screen of the display unit according to the first example embodiment.

In order to display the moving image data extracted by the extraction unit 104 in a two-dimensional manner, the display control unit 103 displays icons corresponding to moving image data (e.g., thumbnail images of corresponding moving image data) on the screen of the display unit 102. FIG. 3 shows an example of the screen (i.e., an image displayed on the screen) of the display unit 102 in this state.

In the screen shown in FIG. 3, the display control unit 103 displays icons corresponding to the moving image data extracted by the extraction unit 104 in a display area R21. In FIG. 3, the icons are thumbnail images of corresponding moving image data.

Further, when the display control unit 103 displays icons, it disposes (places), for the moving image data corresponding to the icons, the icons at positions on the screen corresponding to the scores calculated by the score calculation unit 106. In FIG. 3, the display control unit 103 disposes each of the icons in such a manner that the higher the score is, the closer to the right side of the screen the icon is positioned. However, the way of positioning of icons is not limited to this example. That is, the display control unit 103 may dispose each of the icons in such a manner that the higher the score is, the closer to the left side of the screen the icon is positioned, the closer to the upper side (or lower side) of the screen the icon is positioned, or the farther from an arbitrary reference point on the screen the icon is positioned.

Further, in the screen shown in FIG. 3, the display control unit 103 displays the conditions used for the extraction by the extraction unit 104, i.e., the conditions included in the predetermined rule, in a display area R22. Further, the display control unit 103 displays visual information visually representing the conditions used for the extraction by the extraction unit 104 in a display area R23. In this way, the user can visually check the conditions used for the extraction. In FIG. 3, the display control unit 103 displays visual information representing that the vehicle is approaching three pedestrians who are crossing a crosswalk in order to express a condition "Crosswalk" and a condition that "There are pedestrians (At least three pedestrians)".

Further, in the screen shown in FIG. 3, when the user performs a clicking operation on one of the icons, the display control unit 103 plays back and displays moving image data corresponding to the icon in a display area R24. In FIG. 3, since the user clicks an icon showing a thumbnail image of a scene X, the display control unit 103 plays back and displays moving image data containing the scene X. Further, the display control unit 103 displays sensor information of travelling data of the own vehicle at the time when the moving image data containing the scene X was photographed (i.e., filmed) in a display area R25. The sensor information is information detected (i.e., obtained) by a sensor of the own vehicle, such as the running speed of the own vehicle, an object distance, and the like. Note that the sensor information is also called CAN (Controller Area Network) information. Further, the display control unit 103 displays, on the display area R25, for each of the individual conditions used for the extraction by the extraction unit 104, a corresponding place on the time axis at which the moving image data meets the condition. In FIG. 3, since the user has clicked an icon showing a thumbnail image of the scene X, the display control unit 103 displays, for each of the conditions used for the extraction, a corresponding place on the time axis at which the moving image data containing the scene X meets the condition.

Further, in the screen shown in FIG. 3, an icon(s) displayed on the display area R21 can be moved by an operation performed by the user. It is assumed that, in FIG. 3, an icon can be moved by a drag-and-drop operation.

It is assumed that the user performs such operations that he/she moves icons corresponding to moving image data containing a scene he/she wants to see closer to each other, and moves an icon(s) corresponding to moving image data that does not contain the scene he/she wants to see away from the above-described icons moved closer to each other. It is assumed that, in FIG. 3, in addition to the above-described operations, the user performs such operations that he/she moves an icon(s) corresponding to moving image data containing the scene he/she wants to see toward the right side of the screen.

Further, in the screen shown in FIG. 3, the display control unit 103 thickens the frame line of the icon that has been moved by the user in order to distinguish it from the other icons. Note that it is considered the icons moved by the user have been correctly classified. Therefore, the user can distinguish the icon of which the frame line is thick from the other icons as one that has been correctly classified. However, the way of distinguishing an icon is not limited to this example. That is, the display control unit 103 may display an icon moved by a user in a different manner, such as displaying its frame line in a specific color. Further, the display control unit 103 displays a "trash can" as an unnecessary area in a display area R21. The user puts icons corresponding to moving image data of which the images are coarse and icons corresponding to moving image data that have been determined to have no relation to the scene he/she wants to see into the "trash can". The moving image data corresponding to the icons put in the "trash can" are no longer handled as those to be classified, and no processing is performed therefor. In this way, the load of the subsequent processing is reduced, and it is expected that the accuracy of the classification will improve.

Further, in the screen shown in FIG. 3, the display control unit 103 displays a "Before-change button" in a display area R26. As will be described later, when an icon is moved on the screen by an operation performed by the user, the learning unit 105 relearns a weight of each of a plurality of feature values, and the display control unit 103 re-disposes (rearranges) the icons according to the result of the relearning. When the user performs a clicking operation on the "Before-change button", the display control unit 103 displays the position of the icon before weights are relearned by a dashed line. In this way, the user can check the position of the icon before weights are relearned. However, the way of displaying the position of an icon before relearning is not limited to this example. That is, the display control unit 103 may display the position of an icon before relearning in a different manner.

The movement detection unit 107 detects that an icon has been moved on the screen by an operation performed by the user. Every time a movement of an icon is detected by the movement detection unit 107 (except the movement to the "trash can" in FIG. 3), the learning unit 105 relearns the weight of each of a plurality of feature values, and the score calculation unit 106 re-calculates (recalculates) the score of the moving image data. Further, the display control unit 103 re-disposes the icons.

The learning unit 105 relearns the weight of each of a plurality of feature values by using the position on the screen to which the icon has been moved. More specifically, the learning unit 105 relearns the weight of each of a plurality of feature values so that the score of the moving image data corresponding to the icon, which has been moved on the screen, becomes a score corresponding to the position to which the icon has been moved.

Further, the score calculation unit 106 re-calculates the score for the moving image data extracted by the extraction unit 104 by using a plurality of already-generated feature values and the weight of each of a plurality of feature values relearned by the learning unit 105.

Further, the display control unit 103 re-disposes the icons corresponding to the moving image data extracted by the extraction unit 104 to the positions on the screen corresponding to the scores re-calculated by the score calculation unit 106.

Note that in the first example embodiment, the above-described relearning, the re-calculation, and the re-disposition are performed every time a movement of an icon is detected. However, the above-described relearning, the re-calculation, and the re-disposition may be performed at other timings. Examples of other conceivable timings include periodic timings and a timing at which a user instruction is received (such as a timing at which a button (not shown) is depressed).

Figure 4:
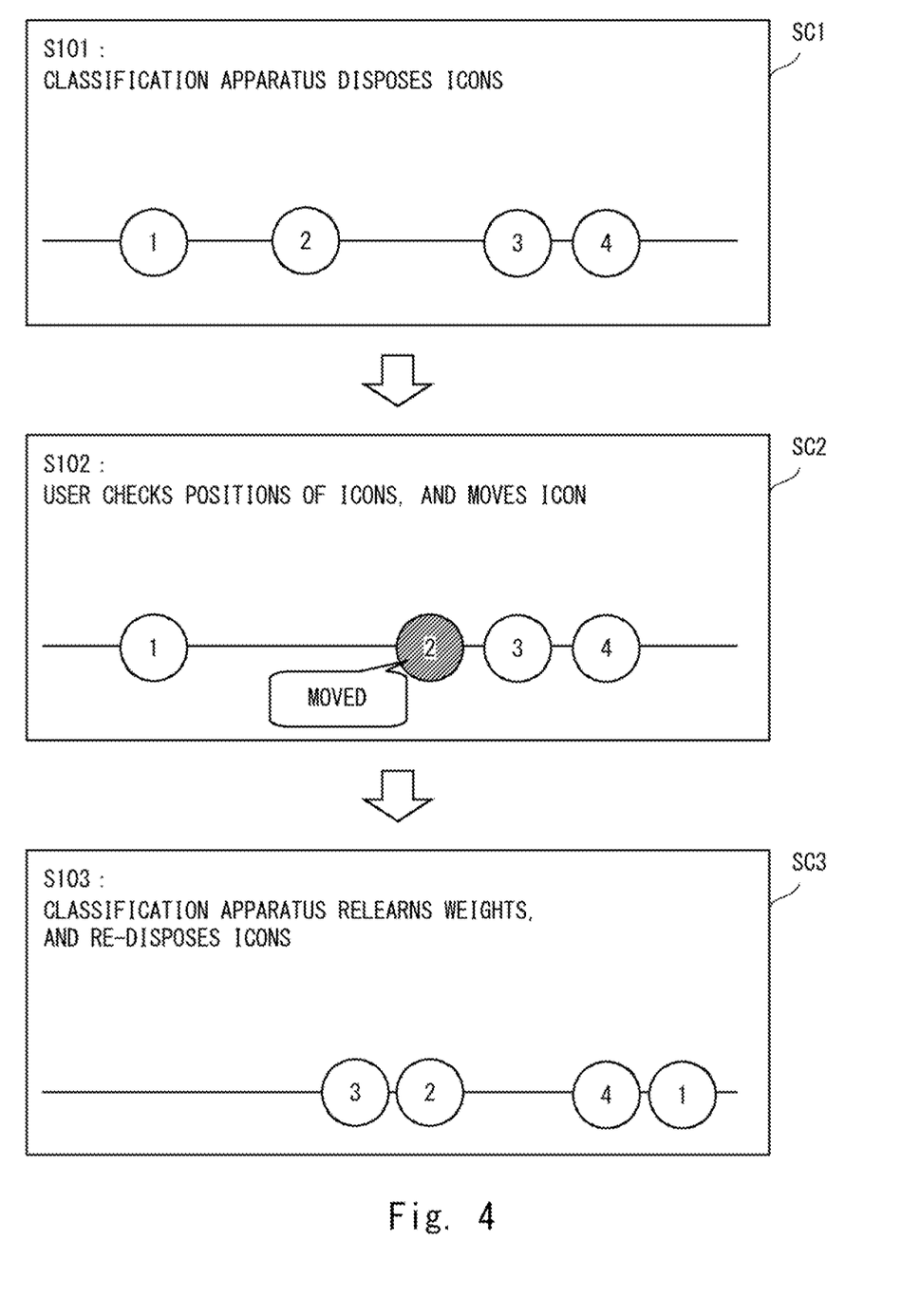
FIG. 4 shows an example of a transition of images on the screen of the display unit according to the first example embodiment.

An example of a transition of images on the screen of the display unit 102 when icons are re-disposed will be described hereinafter with reference to FIG. 4. In FIG. 4, for example, a circle with a number "1" at the center represents an icon corresponding to moving image data 1 (the same applies to FIG. 6 described later). Further, it is assumed that, in FIG. 4, four moving image data 1 to 4 have been extracted by the extraction unit 104. Further, it is assumed that, in FIG. 4, the higher the score is, the closer to the right side of the screen the icon is positioned.

Step S101:

For each of the moving image data 1 to 4, the score calculation unit 106 calculates a score by generating a plurality of feature values and multiplying each of the plurality of generated feature values by a weight that has been learned in advance by the learning unit 105. It is assumed that, as a result, when the scores are arranged in ascending order, the moving image data are arranged in the order of the moving image data 1, the moving image data 2, the moving image data 3, and the moving image data 4.

Therefore, the display control unit 103 arranges icons corresponding to the moving image data 1 to 4, respectively, as shown on a screen SC1.

Step S102:

While checking the positions of the icons, the user determines that the moving image data 2 and 3 contain a scene(s) he/she wants to see. Therefore, the user moves the icon corresponding to the moving image data 2 so as to be closer to the icon corresponding to the moving image data 3. As a result, the screen of the display unit 102 becomes a screen SC2.

Step S103:

The learning unit 105 relearns the weight of each of a plurality of feature values so that the score of the moving image data 2 becomes a score corresponding to the position to which the icon corresponding to the moving image data 2 has been moved, i.e., so that the score of the moving image data 2 gets closer to the score of the moving image data 3.

The score calculation unit 106 calculates, for each of the moving image data 1 to 4, a score by multiplying each of a plurality of already-calculated feature values by a respective weight relearned by the learning unit 105. It is assumed that, as a result, when the scores are arranged in ascending order, the moving image data are arranged in the order of the moving image data 3, the moving image data 2, the moving image data 4, and the moving image data 1.

Therefore, the display control unit 103 arranges icons corresponding to the moving image data 1 to 4, respectively, as shown on a screen SC3.

The moving of an icon by the user, the relearning of weights, the re-calculation of a score, and the re-disposition of the icons are repeatedly performed until the user determines that the result of the classification of the moving image data has required accuracy. For example, the user may determine a threshold position on the screen in advance, calculate, as a recall ratio, a ratio of icons corresponding to moving image data containing a scene he/she wants to see to icons that exceed the threshold position, and when the recall ratio is equal to or higher than a predetermined value (e.g., 80%), determine that the result of the classification of the moving image data has the required accuracy.

When the user determines that the result of the classification of the moving image data has the required accuracy, the user performs an operation for range-selecting an icon(s) corresponding to the moving image data containing a scene(s) he/she wants to see on the screen.

In the screen shown in FIG. 3, when the user determines that the result of the classification of the moving image data has the required accuracy, the user performs range-selection by a dragging operation. However, the way of range-selection is not limited to this example. That is, the user may perform range-selection through a different operation.

When range-selection is performed on the screen through an operation performed by the user, the specifying unit 108 specifies, based on the position of the icon on the screen at that moment, the classification of the moving image data corresponding to the icon. The classification in this process is a classification as to whether the moving image data contains the scene the user wants to see, or whether two or more moving image data belong to the same group.

When range-selection is performed on the screen through an operation performed by the user, the output unit 109 outputs moving image data corresponding to an icon(s) located within the selected range. Note that the output unit 109 may output a file name, a shooting time (a filming time), or the like of the moving image data together with the moving image data itself.

Operations performed by the classification apparatus 10 according to the first example embodiment will be described hereinafter.

Figure 5:
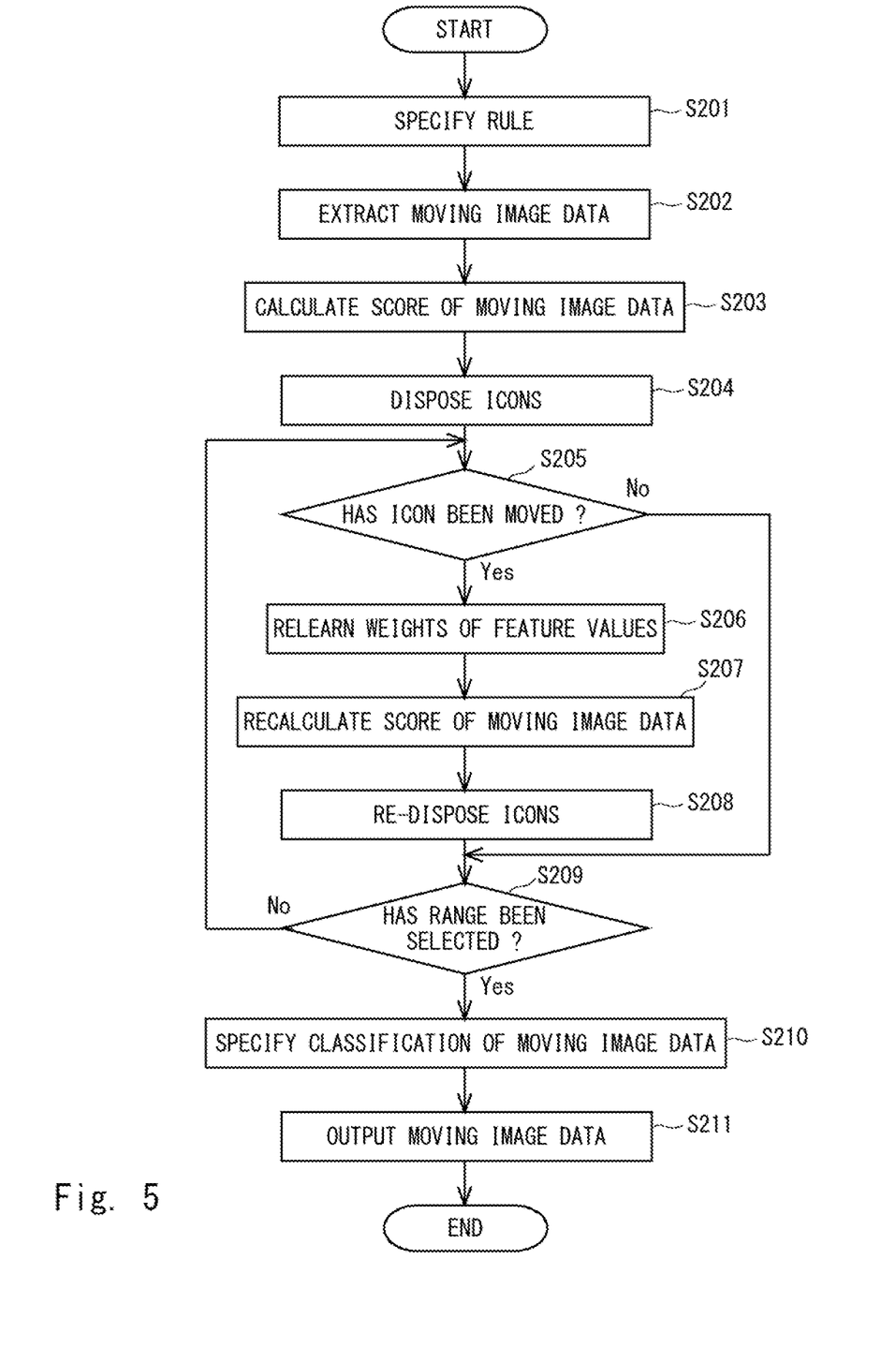
FIG. 5 is a flowchart for explaining an example of an outline operation flow of a classification apparatus according to the first example embodiment.

Firstly, an example of an outline operation flow of the classification apparatus 10 according to the first example embodiment will be described with reference to FIG. 5.

When a predetermined rule(s) is specified by an operation performed by a user (Step S201), the extraction unit 104 extracts, from moving image data accumulated in a server (not shown), moving image data (e.g., one of the moving image data accumulated in the server) by using the specified predetermined rule (Step S202).

Next, the score calculation unit 106 generates each of a plurality of feature values for the moving image data extracted by the extraction unit 104, and calculates a score(s) by using each of the plurality of generated feature values and a weight of each of a plurality of feature values learned in advance by the learning unit 105 (Step S203).

Next, the display control unit 103 displays an icon(s) corresponding to the moving image data extracted by the extraction unit 104 on the screen of the display unit 102 (Step S204). Note that the display control unit 103 disposes, for the moving image data, the icon(s) corresponding to the moving image data at a position(s) on the screen corresponding to the score(s) calculated by the score calculation unit 106.

After that, the movement detection unit 107 detects whether or not an icon has been moved on the screen by an operation performed by the user (Step S205).

When a movement of an icon is detected by the movement detection unit 107 (Yes in Step S205), the learning unit 105 relearns the weight of each of a plurality of feature values so that the score of the moving image data corresponding to the icon, which has been moved on the screen, becomes a score corresponding to the position to which the icon has been moved (Step S206). Further, the score calculation unit 106 re-calculates the score for the moving image data extracted by the extraction unit 104 by using a plurality of already-generated feature values and the weight of each of a plurality of feature values relearned by the learning unit 105 (Step S207). Further, the display control unit 103 re-disposes the icon(s) corresponding to the moving image data extracted by the extraction unit 104 to the position(s) corresponding to the score(s) re-calculated by the score calculation unit 106 on the screen (Step S208).

After that, the operations in the steps S205 to S208 are repeated until range-selection is performed on the screen by an operation performed by the user.

When range-selection is performed on the screen by an operation performed by the user (Yes in Step S209), the specifying unit 108 specifies the classification of the moving image data corresponding to the icon based on the position of the icon on the screen at that moment (Step S210). Further, the output unit 109 outputs the moving image data corresponding to the icon located within the range selected by the user (Step S211). Through the above-described processes, the operations are finished.

Figure 6:
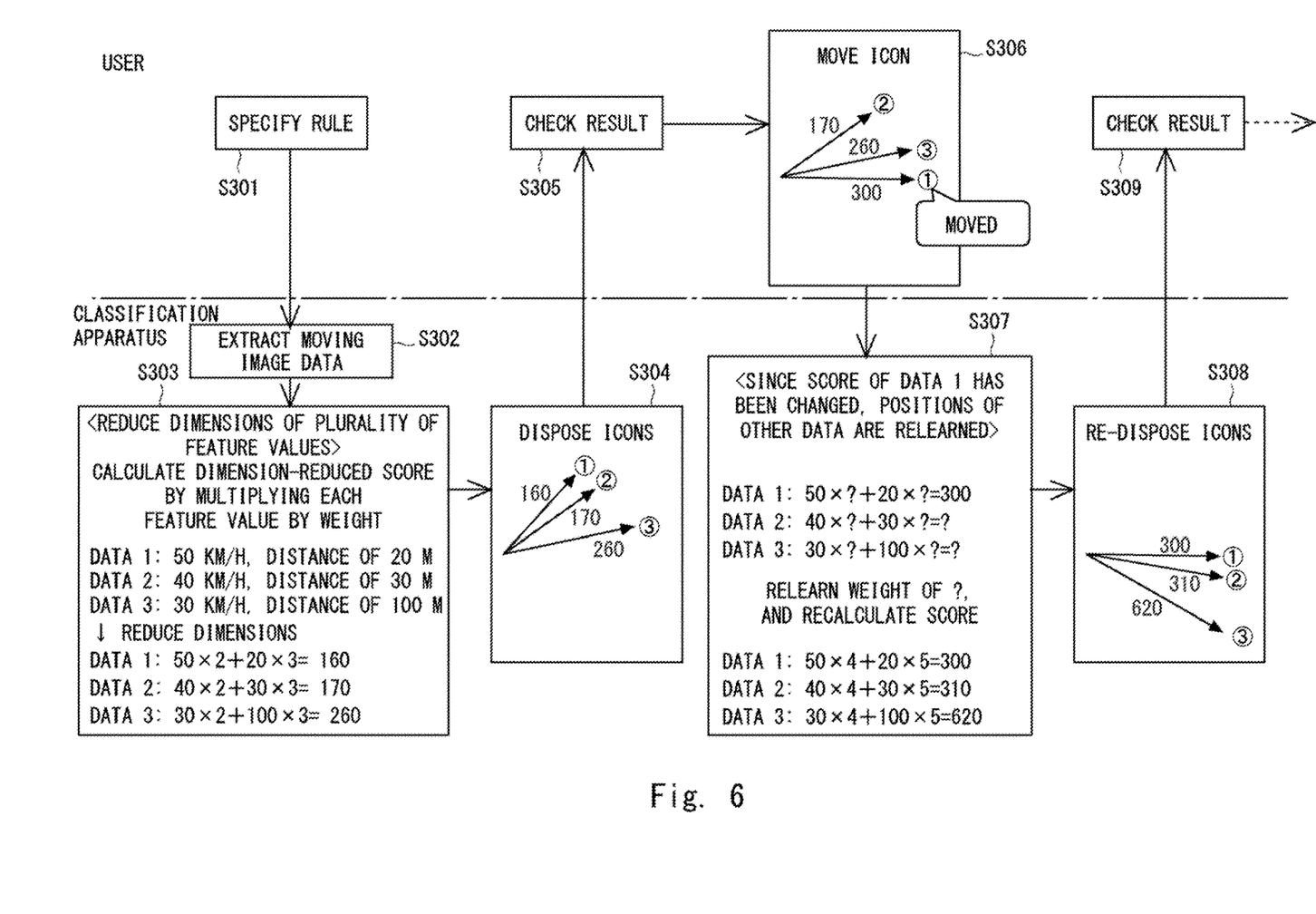
FIG. 6 is a diagram for explaining operations performed by the classification apparatus according to the first example embodiment in a more concrete manner.

Next, operations performed by the classification apparatus 10 according to the first example embodiment will be described in a more detailed manner with reference to FIG. 6. Note that the operations shown in FIG. 6 correspond to the operations in the steps S201 to S208 shown in FIG. 5.

Step S301:

Firstly, a user performs an operation for specifying a predetermined rule(s).

Step S302:

Next, the extraction unit 104 extracts moving image data using the predetermined rule specified by the user. In this example, it is assumed that three moving image data 1 to 3 have been extracted by the extraction unit 104.

Step S303:

Next, the score calculation unit 106 calculates, for each of the three moving image data 1 to 3, a dimension-reduced score by generating each of a plurality of feature values and multiplying each of the plurality of generated feature values by a respective weight learned in advance by the learning unit 105.

In this example, it is assumed that the feature values generated from the moving image data contain two values, i.e., a running speed and an object distance.

Further, it is assumed that: the running speed is 50 km/h and the object distance is 20 m in the moving image data 1; the running speed is 40 km/h and the object distance is 30 m in the moving image data 2; and the running speed is 30 km/h and the object distance is 100 m in the moving image data 3.

Further, it is assumed that the weight learned in advance by the learning unit 105 for the running speed is "2" and that for the object distance is "3".

Therefore, the score calculation unit 106 calculates a score for each of the three moving image data 1 to 3 as follows:

| | |
|---|---:|
| 50×2+20×3=160 | Moving Image Data 1: |
| 40×2+30×3=170 | Moving Image Data 2: |
| 30×2+100×3=260 | Moving Image Data 3: |

Step S304:

Next, the display control unit 103 disposes the three icons corresponding to the three moving image data 1 to 3 at positions corresponding to the calculated scores on the screen of the display unit 102. In this example, it is assumed that the higher the score is, the closer to the lower side of the screen the icon is positioned.

Steps S305 and S306:

Next, the user checks the screen (i.e., the image on the screen) displayed in the step S304 and, if necessary, performs an operation for moving an icon(s) on the screen. In this example, it is assumed that the user has moved the icon corresponding to the moving image data 1 toward the lower side of the screen beyond the icon corresponding to the moving image data 3. Further, it is assumed that the score of the moving image data 1 corresponding to the position to which the corresponding icon has been moved is "300".

Step S307:

As described above, the score of the moving image data 1 has been changed from "160" to "300". Therefore, the learning unit 105 relearns the weight of each of the running speed and the object distance so that the score of the moving image data 1 becomes "300". In this example, it is assumed that the weight relearned by the learning unit 105 for the running speed is "4" and that for the object distance is "5".

Therefore, the score calculation unit 106 re-calculates, for each of the three moving image data 1 to 3, the dimension-reduced score by multiplying each of the already-calculated running speed and the object distance by the respective weight relearned by the learning unit 105.

In this example, the score calculation unit 106 re-calculates the score for each of the three moving image data 1 to 3 as follows:

| | |
|---|---:|
| 50×4+20×5=300 | Moving Image Data 1: |
| 40×4+30×5=310 | Moving Image Data 2: |
| 30×4+100×5=620 | Moving Image Data 3: |

Step S308:

Next, the display control unit 103 re-disposes the three icons corresponding to the three moving image data 1 to 3 at positions corresponding to the re-calculated scores on the screen of the display unit 102.

Step S309:

Next, the user checks the screen (i.e., the image on the screen) displayed in the step S308. After that, if necessary, operations similar to those in the steps S306 to S308 are repeated.

As described above, according to the first example embodiment, the extraction unit 104 extracts moving image data by using a predetermined rule(s), and the display control unit 103 displays an icon(s) corresponding to the extracted the moving image data on the screen of the display unit 102. Further, the movement detection unit 107 detects a movement of an icon on the screen caused by an operation performed by the user, and the specifying unit 108 specifies the classification of the moving image data corresponding to the icon based on the position of the icon on the screen.

As described above, in the first example embodiment, after extracting moving image data by using a predetermined rule(s), a user classifies the moving image data by performing an operation for moving the icon corresponding to the moving image data based on his/her own knowledge, so that the moving image data is classified. In this way, it is possible to classify moving image data more accurately. Further, it is possible to shorten the working time for obtaining the accurate classification result. Further, it is possible to discover unexpected moving image data. Further, it is possible to effectively use moving image data accumulated in the server.

Second Example Embodiment

Figure 7:
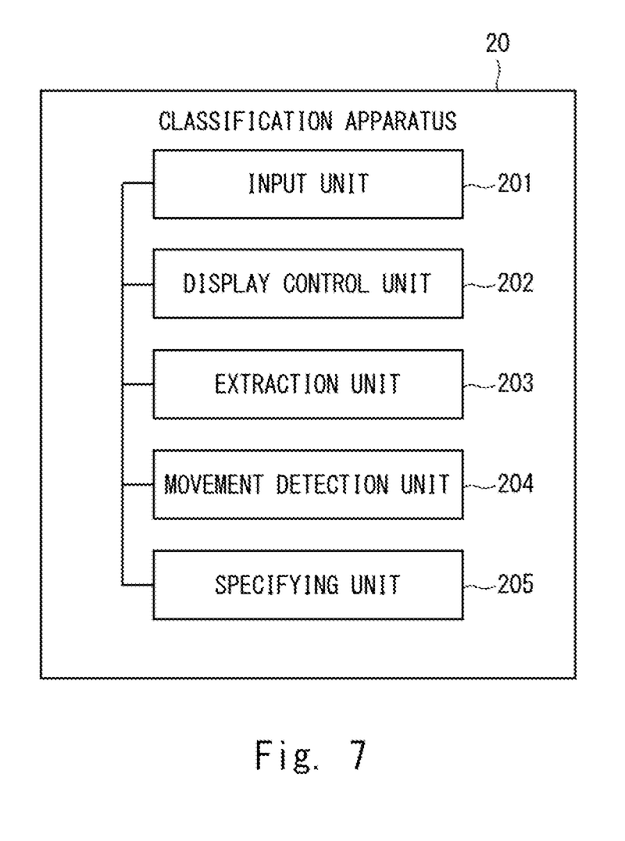
FIG. 7 is a block diagram showing an example of a configuration of a classification apparatus according to a second example embodiment.

Next, an example of a configuration of a classification apparatus 20 according to a second example embodiment will be described with reference to FIG. 7. The second example embodiment corresponds to an example embodiment in which the above-described first example embodiment is more generalized. As shown in FIG. 7, the classification apparatus 20 according to the second example embodiment includes an input unit 201, a display control unit 202, an extraction unit 203, a movement detection unit 204, and a specifying unit 205.

The input unit 201 receives an operation from a user.

The extraction unit 203 extracts moving image data by using predetermined rule(s).

The display control unit 202 displays an icon(s) corresponding to the extracted moving image data on the screen of the display unit. The display unit may be installed inside the classification apparatus 20 or outside thereof.

The movement detection unit 204 detects a movement of an icon on the screen caused by an operation performed by the user.

The specifying unit 205 specifies the classification of the moving image data corresponding to the icon based on the position of the icon on the screen.

As described above, in the second example embodiment, after extracting moving image data by using a predetermined rule(s), a user classifies the moving image data by performing an operation for moving the icon corresponding to the moving image data based on his/her own knowledge, so that the moving image data is classified. In this way, it is possible to classify moving image data more accurately.

Note that the classification apparatus 20 according to the second example embodiment may further include a learning unit that learns a weight of each of a plurality of feature information generated from moving image data, and a score calculation unit that generates each of a plurality of feature information for the extracted moving image data and calculates a score by using the plurality of generated feature information and the learned weight of each of the plurality of feature information. Further, the display control unit 202 may dispose an icon corresponding to the extracted moving image data at a position on the screen corresponding to the calculated score of the moving image data.

Further, when a movement of an icon on the screen is detected, the learning unit may relearn the weight of each of the plurality of feature information by using the position on the screen to which the icon has been moved. Further, when a movement of an icon on the screen is detected, the score calculation unit may recalculate the score for the extracted moving image data by using the relearned weight of each of the plurality of feature information. Further, when a movement of an icon on the screen is detected, the display control unit 202 may re-dispose the icon(s) corresponding to the extracted moving image data to a position on the screen corresponding to the re-calculated score of the moving image data.

Further, when a movement of an icon on the screen is detected, the learning unit may relearn the weight of each of the plurality of feature information so that the score of the moving image data corresponding to the icon becomes a score corresponding to the position on the screen to which the icon has been moved.

Further, the predetermined rule may contain a combination of conditions indicating a state of a nearby object(s) shown in the moving image data. Further, the predetermined rule may be specified by an operation performed by the user. Further, the display control unit 202 may further display visual information visually representing the conditions used for the extraction on the screen.

Further, when an icon is selected by an operation performed by the user, the display control unit 202 may play back and display moving image data corresponding to the icon on the screen, display sensor information of the moving image data at the shooting time (or the filming time), and display, for each of the conditions used for the extraction, a corresponding place on the time axis at which the moving image data meets the condition.

Further, the display control unit 202 may display the position of the icon of which the weight has not been relearned yet on the screen according to an operation performed by the user.

Further, the classification apparatus 20 according to the second example embodiment may further include an output unit that outputs, when a range on the screen is selected by an operation performed by the user, moving image data corresponding to an icon(s) located within the selected range.

Computer that Implements Classification Apparatus According to Example Embodiment Next, an example of a hardware configuration of a computer 30 that implements some of the functions of the classification apparatus 10 or 20 according to the above-described first or second example embodiment will be described with reference to FIG. 8.

Figure 8:
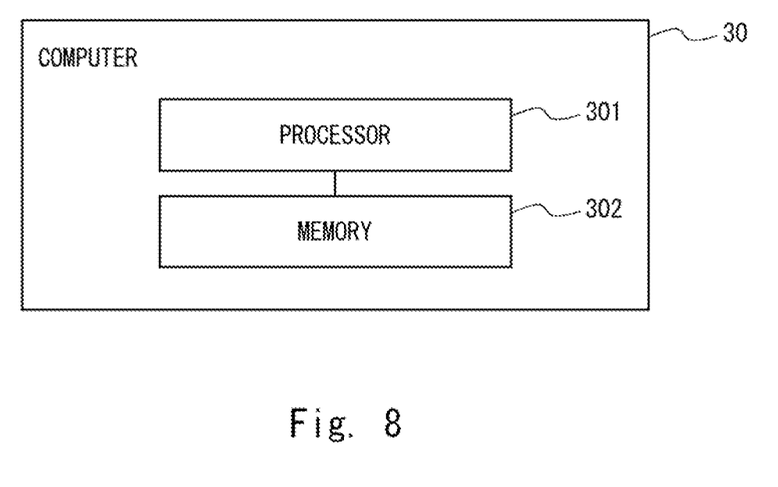
FIG. 8 is a block diagram showing an example of a hardware configuration of a computer for implementing some functions of a classification apparatus according to the first or second example embodiment.

As shown in FIG. 8, the computer 30 includes a processor 301 and a memory 302.

The processor 301 may be, for example, a microprocessor, an MPU (Micro Processing Unit), or a CPU (Central Processing Unit). The processor 301 may include a plurality of processors.

The memory 302 is composed of a combination of a volatile memory and a nonvolatile memory. The memory 302 may include a storage located remotely from the processor 301. In this case, the processor 301 may access the memory 302 through an I (Input)/O (Output) interface (not shown).

A program(s) is stored in the memory 302. This program includes a group of instructions (or software code) for making, when being loaded into the computer 30, the computer 30 perform some of the functions of the classification apparatus 10 or 20 according to the above-described first or second example embodiment. The components in the above-described classification apparatuses 10 and 20 may be implemented by having the processor 301 load a program(s) stored in the memory 302 and execute the loaded program(s). Further, the storing function in the above-described classification apparatus 10 or 20 may be implemented by the memory 302.

Further, the above-described program may be stored in a non-transitory computer readable medium or a tangible storage medium. Examples of the computer readable medium or the tangible storage medium include, but are not limited to, a random-access memory (RAM), a read-only memory (ROM), a flash memory, a solid-state drive (SSD) or other memory technologies, a CD-ROM, a digital versatile disc (DVD), a Blu-ray (Registered Trademark) disk or other optical disk storages, a magnetic cassette, a magnetic tape, and a magnetic disk storage or other magnetic storage devices. The program may be transmitted through a transitory computer readable medium or a communication medium. Examples of the transitory computer readable medium or the communication medium include, but are not limited to, an electrically propagating signal, an optically propagating signal, an acoustically propagating signal, or other forms of propagating signals.

Although the present disclosure is described above with reference to example embodiments, the present disclosure is not limited to the above-described example embodiments. Various modifications that can be understood by those skilled in the art can be made to the configuration and details of the present disclosure within the scope of the disclosure.

Further, the whole or part of the example embodiments disclosed above can be described as, but not limited to, the following supplementary notes.

(Supplementary Note 1)

A classification apparatus comprising:
an input unit configured to receive an operation performed by a user;
an extraction unit configured to extract moving image data by using a predetermined rule;
a display control unit configured to display an icon corresponding to the extracted moving image data on a screen of a display unit;
a movement detection unit configured to detect a movement of the icon on the screen caused by the operation performed by the user; and
a specifying unit configured to specify a classification of the moving image data corresponding to the icon based on a position of the icon on the screen.

(Supplementary Note 2)

The classification apparatus described in Supplementary note 1, further comprising:
a learning unit configured to learn a weight of each of a plurality of feature information generated from moving image data; and
a score calculation unit configured to generate each of a plurality of feature information for the extracted moving image data and calculate a score by using the plurality of generated feature information and the learned weight of each of the plurality of feature information, wherein
the display control unit disposes an icon corresponding to the extracted moving image data at a position on the screen corresponding to the calculated score of the moving image data.

(Supplementary Note 3)

The classification apparatus described in Supplementary note 2, wherein
when a movement of an icon on the screen is detected, the learning unit relearns the weight of each of the plurality of feature information by using the position on the screen to which the icon has been moved,
when a movement of an icon on the screen is detected, the score calculation unit recalculates the score for the extracted moving image data by using the weight of each of the plurality of relearned feature information; and
when a movement of an icon on the screen is detected, the display control unit re-disposes the icon corresponding to the extracted moving image data to a position on the screen corresponding to the re-calculated score of the moving image data.

(Supplementary Note 4)

The classification apparatus described in Supplementary note 3, wherein when a movement of an icon on the screen is detected, the learning unit relearns the weight of each of a plurality of feature information so that the score of the moving image data corresponding to the icon becomes a score corresponding to the position on the screen to which the icon has been moved.

(Supplementary Note 5)

The classification apparatus described in any one of Supplementary notes 1 to 4, wherein the predetermined rule contains a combination of conditions indicating a state of a nearby object shown in the moving image data.

(Supplementary Note 6)

The classification apparatus described in Supplementary note 5, wherein
the predetermined rule is specified by an operation performed by the user, and
the display control unit further displays visual information visually representing a condition used for the extraction on the screen.

(Supplementary Note 7)

The classification apparatus described in Supplementary note 5 or 6, wherein when an icon is selected by an operation performed by the user, the display control unit plays back and displays moving image data corresponding to the icon on the screen, displays sensor information of the moving image data at a shooting time, and displays, for each of the conditions used for the extraction, a corresponding place on a time axis at which the moving image data meets the condition.

(Supplementary Note 8)

The classification apparatus described in Supplementary note 3 or 4, wherein the display control unit displays a position of the icon of which the weight has not been relearned yet on the screen according to an operation performed by the user.

(Supplementary Note 9)

The classification apparatus described in any one of Supplementary notes 1 to 8, further comprising an output unit configured to output, when a range on the screen is selected by an operation performed by the user, moving image data corresponding to an icon located within the selected range.

(Supplementary Note 10)

A classification method performed by a classification apparatus, comprising:
a step of extracting moving image data by using a predetermined rule;
a step of displaying an icon corresponding to the extracted moving image data on a screen of a display unit;
a step of detecting a movement of the icon on the screen caused by an operation performed by a user; and
a step of specifying a classification of the moving image data corresponding to the icon based on a position of the icon on the screen.

(Supplementary Note 11)

A non-transitory computer readable medium storing a program to be executed by a computer, the program including:
- a step of extracting moving image data by using a predetermined rule;
- a step of displaying an icon corresponding to the extracted moving image data on a screen of a display unit;
- a step of detecting a movement of the icon on the screen caused by an operation performed by a user; and
- a step of specifying a classification of the moving image data corresponding to the icon based on a position of the icon on the screen.

REFERENCE SIGNS LIST

10 CLASSIFICATION APPARATUS
101 INPUT UNIT
102 DISPLAY UNIT
103 DISPLAY CONTROL UNIT
104 EXTRACTION UNIT
105 LEARNING UNIT
106 SCORE CALCULATION UNIT
107 MOVEMENT DETECTION UNIT
108 SPECIFYING UNIT
109 OUTPUT UNIT
20 CLASSIFICATION APPARATUS
20 201 INPUT UNIT
202 DISPLAY CONTROL UNIT
203 EXTRACTION UNIT
204 MOVEMENT DETECTION UNIT
205 SPECIFYING UNIT
30 COMPUTER
301 PROCESSOR
302 MEMORY

The invention claimed is:

1. A classification apparatus comprising:
at least one memory storing instructions, and
at least one processor configured to execute the instructions to:
- extract moving image data by using a predetermined rule;
- display an icon corresponding to the extracted moving image data on a screen of a display unit;
- receive an operation performed by a user;
- detect a movement of the icon on the screen caused by the operation performed by the user;
- specify a classification of the moving image data corresponding to the icon based on a position of the icon on the screen;
- learn a weight of each of a plurality of feature information generated from moving image data;
- generate a plurality of feature information from the extracted moving image data;
- calculate a score for the extracted moving image data by using the generated plurality of feature information and previously learned weights respectively corresponding to each of the plurality of feature information; and
- place the icon corresponding to the extracted moving image data at a position on the screen corresponding to the calculated score of the moving image data.

2. The classification apparatus according to claim 1, wherein
the at least one processor is further configured to execute the instructions to:
- upon detecting a movement of an icon on the screen, relearn weights respectively corresponding to each of the plurality of feature information by using the position on the screen to which the icon has been moved,
- recalculate the score for the extracted moving image data by using the relearned weights; and
- rearrange the icon corresponding to the extracted moving image data to a position on the screen corresponding to the recalculated score of the moving image data.

3. The classification apparatus according to claim 2, wherein the at least one processor is further configured to execute the instructions to, upon detecting the movement of the icon on the screen, relearn the weights of each of a plurality of feature information so that the score for the moving image data corresponding to the icon becomes a score corresponding to the position on the screen to which the icon has been moved.

4. The classification apparatus according to claim 2, wherein the at least one processor is further configured to execute the instructions to display a position of the icon corresponding to the weights before the relearning on the screen, according to an operation performed by the user.

5. The classification apparatus according to claim 1, wherein the predetermined rule contains a combination of conditions indicating a state of a nearby object shown in the moving image data.

6. The classification apparatus according to claim 5, wherein
the predetermined rule is specified by an operation performed by the user, and
the at least one processor is further configured to execute the instructions to display visual information visually representing a condition used for the extraction on the screen.

7. The classification apparatus according to claim 5, wherein the at least one processor is further configured to execute the instructions to, upon detecting that the icon is selected by an operation performed by the user, play back moving image data corresponding to the icon on the screen, display sensor information at a shooting time of the moving image data, and display a location on a time axis at which the moving image data meets the condition used for extracting the moving image data.

8. The classification apparatus according to claim 1, wherein the at least one processor is further configured to execute the instructions to, upon detecting that a range on the screen is selected by an operation performed by the user, output moving image data corresponding to an icon located within the selected range.

9. A classification method performed by a classification apparatus, comprising:
- extracting moving image data by using a predetermined rule;
- displaying an icon corresponding to the extracted moving image data on a screen of a display unit;
- detecting a movement of the icon on the screen caused by an operation performed by a user;
- specifying a classification of the moving image data corresponding to the icon based on a position of the icon on the screen;
- learning a weight of each of a plurality of feature information generated from moving image data;
- generating a plurality of feature information from the extracted moving image data;

calculating a score for the extracted moving image data by using the generated plurality of feature information and previously learned weights respectively corresponding to each of the plurality of feature information; and placing the icon corresponding to the extracted moving image data at a position on the screen corresponding to the calculated score of the moving image data.

10. A non-transitory computer readable medium storing a program to be executed by a computer, the program including:

extracting moving image data by using a predetermined rule;

displaying an icon corresponding to the extracted moving image data on a screen of a display unit;

detecting a movement of the icon on the screen caused by an operation performed by a user;

specifying a classification of the moving image data corresponding to the icon based on a position of the icon on the screen;

learning a weight of each of a plurality of feature information generated from moving image data;

generating a plurality of feature information from the extracted moving image data;

calculating a score for the extracted moving image data by using the generated plurality of feature information and previously learned weights respectively corresponding to each of the plurality of feature information; and placing the icon corresponding to the extracted moving image data at a position on the screen corresponding to the calculated score of the moving image data.

* * * * *